May 26, 1970     T. C. HALFAKER     3,514,593
LIGHTING FIXTURE WITH FLOATING BAFFLE FRAME
Filed Oct. 4, 1967     2 Sheets-Sheet 1
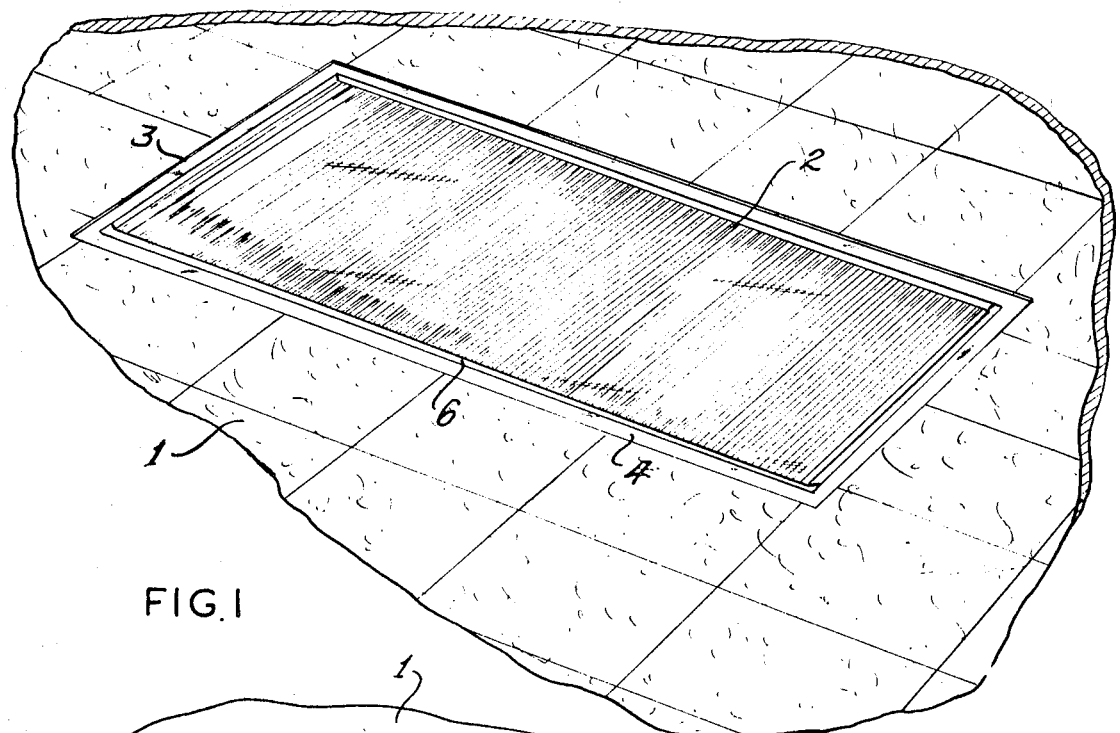
FIG.1
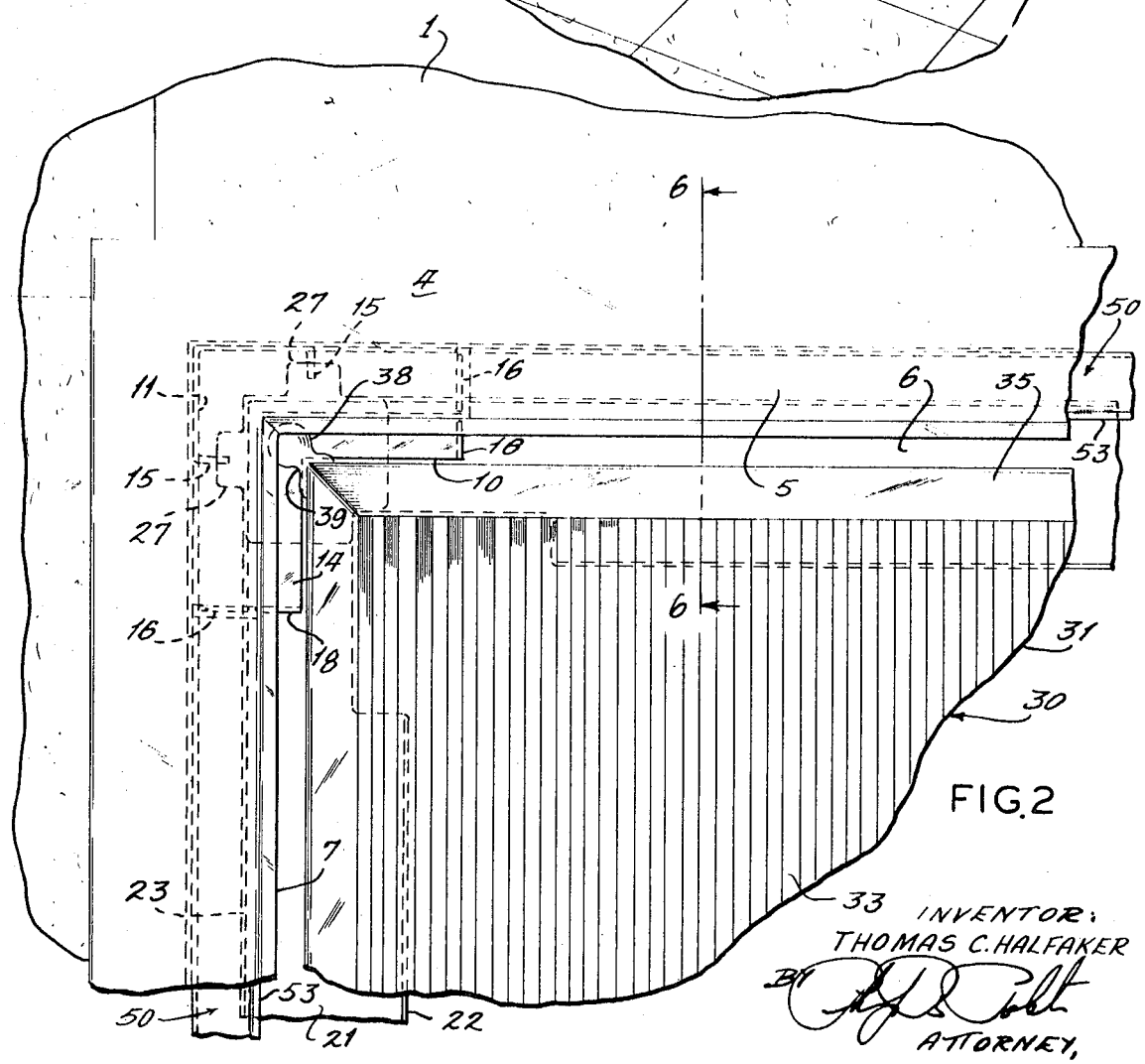
FIG.2
INVENTOR:
THOMAS C. HALFAKER
ATTORNEY,

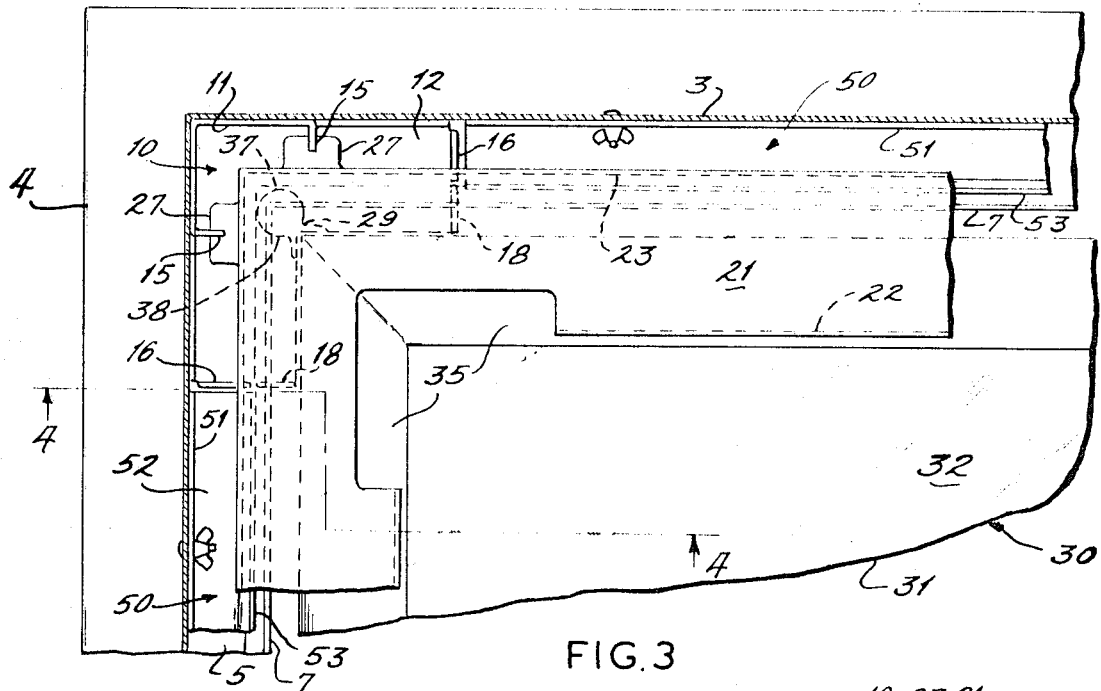
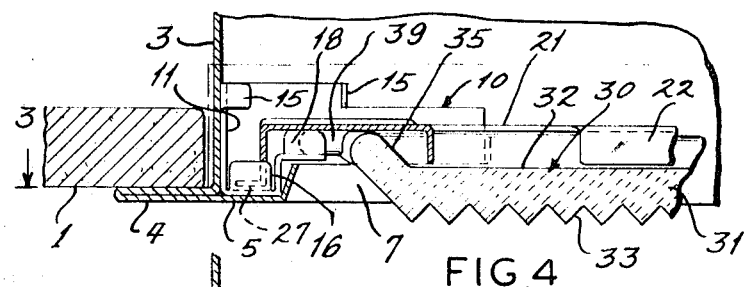
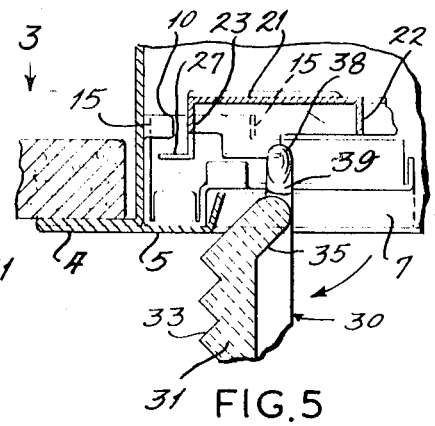
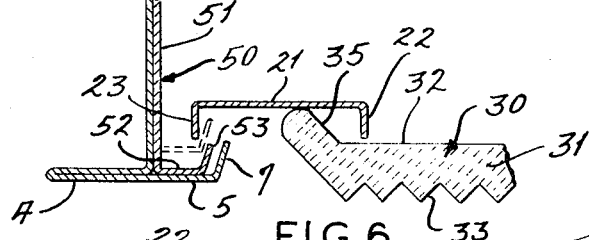
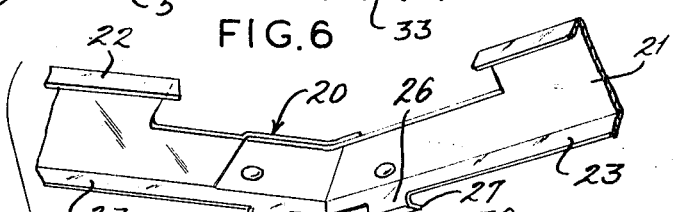
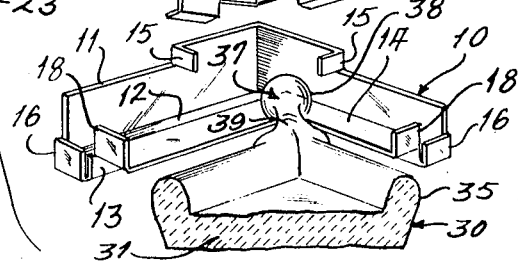

United States Patent Office 3,514,593
Patented May 26, 1970

3,514,593
LIGHTING FIXTURE WITH FLOATING BAFFLE FRAME
Thomas C. Halfaker, St. Louis, Mo., assignor to Emerson Electric Co., St. Louis, Mo., a corporation of Missouri
Filed Oct. 4, 1967, Ser. No. 672,811
Int. Cl. F21s 3/02
U.S. Cl. 240—78          10 Claims

ABSTRACT OF THE DISCLOSURE

A lamp housing with a turned up flange around a central opening has a light-transmitting panel in the opening and spaced from the flange to provide an air-admitting gap. The gap is bridged by a floating continuous bridging frame above the panel and flange and spaced above the flange to permit flow of air through the lamp housing. Integral diagonally outwardly projecting knobs at the corners of the panel rest on shelves of corner brackets. The corner brackets have stop tabs cooperating with feet on the bridging frame to limit the upward movement permitted the floating frame and to prevent its dislodgment from the housing. An adjustable air baffle cooperates with the floating frame to provide adjustment of each panel edge.

BACKGROUND OF THE INVENTION

Particularly in modern fluorescent lighting fixtures, it is desirable to provide circulation of air through the lamp housing to reduce the ambient temperature around the lamps and ballast if the ballast is positioned closely adjacent the lamps. To this end, various arrangements of baffling, of which the arrangement shown in Quin U.S. Pats. 3,103,156 and 157 are representative, have been devised. Such arrangements have generally been confined to two ends or sides of a housing and have involved a considerable amount of structure either in the housing itself or in both the housing and a frame surrounding the light transmitting panel enclosure.

One of the objects of this invention is to provide a fixture with a simple light and dust baffle which is economical to produce and effective in use.

Another object is to provide such a fixture which permits the use of a rectangular light transmitting enclosure which may be hinged down along any one side.

Still another object is to provide such a fixture in which the volume of air flowing through the housing can be regulated discretely at each edge of the enclosure.

Other objects will become apparent to those skilled in the art in the light of the following description and accompanying drawing.

SUMMARY OF THE INVENTION

In accordance with this invention, generally stated, a lighting fixture is provided which has a flange about a central opening, a light transmitting panel removably mounted in the opening adjacent but spaced from the flange, and a continuous bridging frame floatingly mounted for vertical movement and extending around the opening above the panel and the flange and extending over facing edge portions of the panel and the flange. Spacing means are provided for holding the bridging frame out of contact with the flange intermediate the spacing means.

In the preferred embodiment, the light transmitting panel is rectangular and is provided with mounting knobs projecting diagonally outboard at its corners, which knobs rest on corner brackets of the flange, and any two of which knobs along one edge can serve as hinging means by which the panel can be hinged down to permit cleaning or relamping of the fixture.

The bridging frame is preferably provided with downwardly extending legs and outwardly extending feet, and the corner brackets are provided with stop tabs to engage the feet and limit the upward movement permitted the bridging frame.

Also preferably an air control baffle is provided with a part mounted on the fixture adjacent the flange and another part extending within the bridging compass of the bridging frame. The air control baffle is vertically adjustable, so that the clearance between the bridging frame and the baffle part extending within its compass can be varied from nothing to a predetermined maximum.

BRIEF DESCRIPTION OF THE DRAWING

In the drawing, FIG. 1 is a fragmentary view in perspective of one embodiment of fixture of this invention mounted in a ceiling;

FIG. 2 is a fragmentary bottom plan view of the fixture shown in FIG. 1;

FIG. 3 is a sectional view taken along the line 3—3 of FIG. 4;

FIG. 4 is a sectional view taken along the line 4—4 of FIG. 3;

FIG. 5 is a sectional view corresponding to the view shown in FIG. 4 but with an enclosure in hinged down position;

FIG. 6 is a sectional view taken along the line 6—6 of FIG. 2; and

FIG. 7 is an exploded view of corner assembly of the fixture shown in FIGS. 1–6.

DESCRIPTION OF THE PREFERRED EMBODIMENT

Referring now to the drawing for one illustrative embodiment of fixture of this invention, reference numeral 1 indicates a ceiling of indefinite extent, in which a fixture 2 of this invention is mounted.

The fixture 2 includes a lamp housing 3 with a plaster stop 4 extending outboardly from its lower edge, and a flange 5 extending inboardly from its lower edge to define a rectangular central opening 6. The flange 5 has an upturned marginal lip 7 at its inner edge.

The corner brackets 10 are welded, riveted, or otherwise secured to the flange 5, serving the double function of strengthening the housing and providing a simple means of accommodating other parts of the structure, as will be explained hereinafter.

Each corner bracket is symmetrically L shaped, with an outside wall 11, a bottom wall 12, an inboard riser 13, and an inboardly extending shelf 14. Stop tabs 15 are struck in from the walls 11 equidistantly from the corner edge of the bracket. Seal tabs 16 are bent up from the ends of the bottom wall 12, and guide tabs 18 are bent up from the ends of the shelf 14. The shelf 14 projects inboardly beyond the innermost edge of the lip 7 of the flange 5, when the corner bracket is secured.

A light transmitting enclosure 30, complementary in outline to the opening 6, but spaced inwardly along and from the lip 7 of the flange 5 on all four sides, is mounted in the opening 6. In the embodiment of enclosure shown, the enclosure has a central web 31 with a plane upper surface 32 and a prismatic lower surface 33, and an upwardly sloping rim 35 extending entirely around it. At each of its corners, the enclosure 30 has a diagonally extending, outwardly projecting mounting knob 37 which, as shown particularly in FIG. 4, is proportioned and arranged to rest on the shelf 14 of the corner brackets 10 when the enclosure is fully mounted as shown in FIG. 1. The mounting knobs 37 have an outer spherical head 38, and a neck 39. Because the mounting knobs 37 slant upwardly, the neck 39 and the spherical head 33 act as centering devices with the corner meeting edges of the shelf 14. The spherical head also serves as a bearing surface upon which and about which the enclosure can be swung down, as shown particularly in FIG. 3, for cleaning or relamping of the fixture. The distance between opposite outboard edges of the knobs on each side is greater than the distance between inboard edges of the shelves, as has been explained, but less than the distance between inboard edges of the adjacent lips 7.

Extending around the entire periphery of the enclosure and flange, is a continuous floating frame 20. The floating frame 20 is in the form of an inverted U shaped channel, with a central web 21, an inner frame wall 22 and an outer frame wall 23. In the embodiment shown, the frame 20 is fabricated of four sections of channel shaped pieces, each with an embossed end which permits the pieces to be joined at their corners by rivets as shown, or any other suitable means. Near each corner the frame is provided with integral depending spacing legs 26, which terminate in outwardly projecting feet 27.

In the embodiment shown, the inner wall 22, and a portion of the web are cut away at each corner of the frame, but this is to accommodate diagonally extending lamps in a particular commercial fixture, and this particular configuration does not form a part of this invention. As far as the invention is concerned, the inner walls 22 and web 21 can take the form of a continuous surface.

The web 21 of the floating frame 20 bridges the space between the outer edge of the rim 35 of the enclosure and the flange 5 of the housing, the inner wall 22 extending downwardly toward, but spaced clear of the surface 32 of the web 31 of the enclosure, and the outer wall 23 extending between the housing wall 3 and the lip 7 of the flange 5. The spacing legs 26 of the corner members, the seal tabs 16 and the rim 35 of the enclosure are all of such height that neither the web nor the walls of the frame 20 touches the web of the enclosure, nor any part of the flange 5 intermediate the spacing legs.

The feet 27 of the legs 26 serve a double function. They serve to locate the frame with respect to the flange 2 laterally of the housing, and, being aligned vertically with the stop tabs 15, they serve to limit upward displacement of the frame with respect to the housing. The upward displacement of the frame which is permitted by the feet and stop tabs is sufficient to permit the enclosure to assume the position shown in FIG. 3 and to be removed from the opening 6 as described hereinafter.

In order to provide a controlled amount of air flow through the lamp housing, a baffle 50 is provided. The baffle 50, in the embodiment shown, is a J-shaped strip, four of which are provided, running between each pair of corner brackets 10 along a housing wall. One of the housing wall and a stem wall 51 of the baffle 50 is slotted, and a wing nut or the like is provided to permit the baffle to be raised and lowered and held at any desired position within the range permitted by the slot. The baffle 50 has a foot part 52 and an upwardly extending toe part 53. The toe part 53 as shown in this embodiment, serves some function, but it may be eliminated if the foot part 52 extends beneath the edge of the depending wall 23 of the frame.

In fabricating the fixture of this illustrative embodiment of fixture of this invention, the housing is made with an integral plaster stop and flange in such a way as to present a smooth and unbroken framing appearance, as shown in FIG. 1. The floating frame and loose corner brackets are installed together. The corner brackets are then riveted to the housing. The stop tabs 15 then cage the frame.

In mounting the enclosure 30, the enclosure is held substantially vertically and one edge is raised within the compass of the lips 7, as distinguished from the shelves 14, until the knobs have cleared the upper edge of the lips 7 and engaged the under side of the web 21 of the frame. The enclosure is then pushed up, raising the frame, until the knobs on that edge can be brought over the upper edges of the tabs 18. That edge of the enclosure is then moved toward the adjacent end of the housing until the knobs at the opposite edge of the enclosure have moved inboard of the tabs 18 of the corner brackets adjacent that opposite edge. The knobs at the opposite end are raised through the opening and above the tabs 18, the enclosure is shifted back until the knobs are past the tabs 18, and the enclosure is permitted to drop into the position shown in FIG. 1. As the enclosure drops, so does the floating frame 20. In the embodiment shown, the rim of the enclosure serves as a spacing means, holding the frame away from the flange. However, the spacing legs 26 can be made to perform this function. The seal tabs 16 may touch the outer wall of the frame, and at least in close proximity to it to seal the corner assembly against the flow of air, since that flow could otherwise not be controlled by the baffle 50.

It can be seen that the floating frame and the flange 5 with its lip 7 forms a light and dust baffle, while still permitting circulation of air through the lamp housing.

In order to adjust the flow of air past any one or more edges of the panel, the enclosure is removed, and one or more of the baffles 50 moved up or down to decrease or increase the flow as the case may be.

Numerous variations in the construction of the fixture of the invention, within the scope of the appended claims will occur to those skilled in the art in the light of the foregoing disclosure. Merely by way of illustration, the baffle, as has been indicated, can be L-shaped rather than J-shaped. It may be omitted entirely if no adjustability in air flow is desired. The seal tabs 18 can serve as spacer means or other spacer means can be employed. The various corner brackets and members can be made integral with their continuous elements. The enclosure can be made in the form of a flat panel with prisms on top or bottom surfaces or both and a metal frame around it with hinge bosses at opposite ends. The knobs can be replaced with hinge stubs, integral with or mounted on the enclosure, projecting outwardly parallel with side edges. This eliminates the advantage of hinging from every side, but may have some commercial advantages. These are merely illustrative.

Having thus described the invention what is claimed and desired to be secured by Letters Patent is:

1. A lighting fixture comprising a flange about an opening; a light-transmitting enclosure removably mounted in said opening adjacent but spaced along at least a part of the bounding edge thereof from said flange, and a continuous bridging frame floatingly mounted for free vertical movement within limits with respect to said flange and said enclosure, resting upon said enclosure and extending entirely around said opening above and beyond adjacent edges of both said enclosure and flange.

2. The lighting fixture of claim 1 wherein the flange has an upturned lip along its inboard edge.

3. The lighting fixture of claim 2 wherein the light transmitting enclosure comprises a central web and an upturned bounding edge around said web.

4. The lighting fixture of claim 1 wherein the central opening and light-transmitting enclosure are rectangular and the enclosure has mounting knobs projecting diagonally outboard at its corners over said flange and is spaced inboard intermediate the said knobs from the flange about the said opening.

5. The lighting fixture of claim 1 wherein an air control baffle is vertically adjustably mounted above said flange, said baffle having a part below and extending within the bridging compass of the bridging frame.

6. A lighting fixture comprising a flange about a central opening; a light-transmitting enclosure removably mounted in said opening adjacent but spaced along at least a part of the bounding edge thereof from said flange; a continuous bridging frame floatingly mounted for vertical movement and extending around said opening above said enclosures and flange, and spacing means for holding said bridging frame out of contact with the said flange, said spacing means comprising depending legs on the bridging frame with outwardly extending feet and corner brackets at corners of the flange with stop tabs, spaced above said flange and above and aligned vertically with said feet to engage said feet and limit the upward movement permitted the said bridging frame.

7. The lighting fixture of claim 6 wherein the corner brackets have seal tabs extending into close proximity to the bridging frame when the enclosure is fully mounted.

8. The lighting fixture of claim 6 wherein the corner brackets have shelves extending inboardly of the flange, and transverse guide tabs projecting upwardly from said shelves.

9. The lighting fixture of claim 8 wherein the light transmitting enclosure is provided with diagonally outwardly projecting knobs, the distance between opposite outboard surfaces of knobs on each edge of the enclosure being greater than the distance between facing opposite inboard edges of the shelves on the adjacent corner brackets, and less than the distance between the facing opposite inboard edges of the adjacent flanges.

10. A lighting fixture comprising a housing having a flange about a center opening; a light-transmitting enclosure removably mounted in said opening adjacent but spaced along at least a part of the bounding edge thereof from said flange; a continuous bridging frame floatingly mounted for free vertical movement within limits with respect to said flange and said enclosure, extending entirely around said opening above and beyond adjacent edges of both said enclosure and flange and resting upon said enclosure, and spacing means for holding reaches of said bridging frame out of contact with the said flange.

References Cited

UNITED STATES PATENTS

| | | | |
|---|---|---|---|
| 3,103,156 | 9/1963 | Quin | 240—47 X |
| 3,211,905 | 10/1965 | Picha | 240—78 X |
| 3,264,470 | 8/1966 | Bodian | 240—78 X |

NORTON ANSHER, Primary Examiner

M. H. HAYES, Assistant Examiner

U.S. Cl. X.R.
240—47, 51.11